(12) United States Patent
Tang

(10) Patent No.: US 11,133,978 B2
(45) Date of Patent: Sep. 28, 2021

(54) REPORT SENDING METHOD, REPORT RECEIVING METHOD, DEVICE AND SYSTEM

(71) Applicant: GUANGDONG OPPO MOBILE TELECOMMUNICATIONS CORP., LTD., Guangdong (CN)

(72) Inventor: Hai Tang, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 139 days.

(21) Appl. No.: 16/609,999

(22) PCT Filed: May 4, 2017

(86) PCT No.: PCT/CN2017/083097
§ 371 (c)(1),
(2) Date: Oct. 31, 2019

(87) PCT Pub. No.: WO2018/201407
PCT Pub. Date: Nov. 8, 2018

(65) Prior Publication Data
US 2020/0067762 A1 Feb. 27, 2020

(51) Int. Cl.
*H04L 12/24* (2006.01)
*H04B 7/155* (2006.01)
(Continued)

(52) U.S. Cl.
CPC ......... *H04L 41/0668* (2013.01); *H04B 7/155* (2013.01); *H04W 24/02* (2013.01); *H04W 24/10* (2013.01); *H04W 48/16* (2013.01)

(58) Field of Classification Search
CPC combination set(s) only.
See application file for complete search history.

(56) References Cited

U.S. PATENT DOCUMENTS

| | | | | |
|---|---|---|---|---|
| 2012/0276897 | A1* | 11/2012 | Kwon | H04B 15/02 455/423 |
| 2013/0288687 | A1* | 10/2013 | Morioka | H04W 36/20 455/437 |
| 2018/0123682 | A1* | 5/2018 | Jung | H04B 7/2606 |

FOREIGN PATENT DOCUMENTS

| | | |
|---|---|---|
| CN | 101827428 A | 9/2010 |
| CN | 102223658 A | 10/2011 |

(Continued)

OTHER PUBLICATIONS

Supplementary European Search Report in the European application No. 17908222.7, dated Dec. 11, 2019.
(Continued)

*Primary Examiner* — Kyaw Z Soe
(74) *Attorney, Agent, or Firm* — Ladas & Parry LLP

(57) ABSTRACT

The embodiments of the present invention relate to the field of communications, and provided thereby are a report sending method, report receiving method, device and system, the method comprising: when radio link failure (RLF) occurs, a terminal generates an RLF report, the RLF report comprising relevant information about the wireless environment in which the terminal is located when the RLF occurs; the terminal receives a terminal information request sent by an access network device, the terminal information request being used for acquiring the RLF report generated by the terminal; and the terminal sends the RLF report to the access network device. According to the embodiments of the present invention, the access network device may identify the wireless environment where the terminal is located when RLF occurs according to an RLF report, so as to subsequently optimize and manage an accessed terminal on the basis of the wireless environment and to improve the access quality of the terminal.

20 Claims, 4 Drawing Sheets

(51) Int. Cl.
  *H04W 24/02* (2009.01)
  *H04W 24/10* (2009.01)
  *H04W 48/16* (2009.01)

(56) References Cited

FOREIGN PATENT DOCUMENTS

| CN | 102291821 A | 12/2011 |
| CN | 102469536 A | 5/2012 |
| EP | 2731372 A1 | 5/2014 |
| JP | 5809647 B2 | 11/2015 |
| JP | 2017509264 A | 3/2017 |
| KR | 20120121692 A | 11/2012 |
| WO | 2016163823 A1 | 10/2016 |

OTHER PUBLICATIONS

Nokia Siemens Networks et al: "Analysis of inter-RAT MRO solutions", 3GPP Draft; R2-122156 Analysis of Inter-RAT MRO Solutions, 3rd Generation Partnership Project (3GPP), Mobile Competence Centre ; 650, Route Des Lucioles ; F-06921 Sophia-Antipolis Cedex ; France, vol. RAN WG2, no. Prague, Czech Republic; May 21, 2012-May 25, 2012, May 14, 2012 (May 14, 2012), XP050607031, [retrieved on May 14, 2012]* pp. 1-3*.

International Search Report in the international application No. PCT/CN2017/083097, dated Jan. 29, 2018.

Written Opinion of the International Search Authority in the international application No. PCT/CN2017/083097, dated Jan. 29, 2018.

Qualcomm Incorporated, etc., Revision of SI: Further Enhancements LTE Device to Device, UE to Network Relays for IoT and Wearables, Approval, 3GPP TSG RAN Meeting #72 RP-161224, Jun. 13-16, 2016 (Jun. 13-16, 2016).

Office Acton of the Indian application No. 201917044733, dated May 10, 2021.

First Office Action of the Korean application No. 10-2019-7035300, dated Apr. 29, 2021.

First Office Action of the Japanese application No. 2019-559106, dated May 14, 2021.

* cited by examiner

REPORT SENDING METHOD, REPORT RECEIVING METHOD, DEVICE AND SYSTEM

TECHNICAL FIELD

The disclosure relates to the field of communication, and more particularly to a report sending method, a report receiving method, device and system.

BACKGROUND

In a Long-Term Evolution (LTE) system, a terminal communicates with a base station through a Radio Link (RL).

When quality of the RL is poor or deteriorates, the terminal triggers a Radio Link Failure (RLF) mechanism for Radio Resource Control (RRC) connection re-establishment with the base station and, after connection re-establishment, identifies in an RRC connection re-establishment complete message (RRCConnectionReestablishmentComplete) that the terminal side stores an RLF report. The base station requests the terminal to report the RLF report in a manner of sending a terminal information request (UEInformationRequest), to acquire a cause for occurrence of an RLF from the RLF report.

For improving utilization of spectrum resources and a network capacity, a Device-to-Device (D2D) technology is introduced into a wireless communication system. Through the technology, a terminal may not only perform D2D communication with a base station but also communicate with the base station through a relay. However, such an RLF mechanism is applied not to a scenario that the terminal is connected with a relay but only to a D2D scenario of the terminal and a base station.

SUMMARY

The embodiments of the disclosure provide a report sending method, a report receiving method, devices and systems, in order to solve the problem in the related art that the RLF mechanism is applied not to a scenario that the terminal is connected with a relay. The following technical solutions are adopted.

According to a first aspect of the embodiments of the disclosure, a report sending method is provided, which may include the following operations.

When an RLF occurs, a terminal generates an RLF report. The RLF report includes information related to a wireless environment where the terminal is located when the RLF occurs.

The terminal receives a terminal information request sent by an access network device. The terminal information request is used for acquiring the RLF report generated by the terminal.

The terminal sends the RLF report to the access network device.

In at least one embodiment, the RLF report may include a connected state identifier. The connected state identifier may be configured to indicate a connected state of the terminal in the wireless environment when the RLF occurs, and the connected state may include a relay connected state and a direct-connection connected state.

In at least one embodiment, the RLF report may include first relay information, and the first relay information may be configured to indicate information of a serving relay device serving the terminal before the RLF occurs.

In at least one embodiment, the first relay information may include at least one of the following: address information of the serving relay device; address information of the terminal; first link quality information, the first link quality information being configured to indicate link quality of a link between the serving relay device and the terminal; or, second link quality information, the second link quality information being configured to indicate link quality of a link between the serving relay device and the access network device.

In at least one embodiment, the RLF report may include second relay information. The second relay information may be configured to indicate information of an adjacent relay device corresponding to the terminal before the RLF occurs, and the adjacent relay device is adjacent to the terminal and does not serve the terminal.

In at least one embodiment, the second relay information may include third link quality information. The third link quality information may be configured to indicate link quality of a link between the terminal and each adjacent relay device.

In at least one embodiment, the link quality may be at least one of Reference Signal Receiving Power (RSRP) or Reference Signal Receiving Quality (RSRQ).

In at least one embodiment, the method may further include the following operation.

When the terminal is in a relay connected state, the terminal reports wireless environment information to the access network device. The wireless environment information includes first wireless environment information and second wireless environment information.

The first wireless environment information may be configured to indicate a connection condition between the terminal and a relay device, and the second wireless environment information may be configured to indicate a connection condition between the relay device and the access network device.

According to a second aspect of the embodiments of the disclosure, a report receiving method is provided, which may include the following operations.

An access network device sends a terminal information request to terminal. The terminal information request is configured to acquire an RLF report generated by the terminal and the RLF report includes information related to a wireless environment where the terminal is located when an RLF occurs.

The access network device receives the RLF report sent by the terminal.

In at least one embodiment, the RLF report may include a connected state identifier. The connected state identifier may be configured to indicate a connected state of the terminal in the wireless environment when the RLF occurs, and the connected state may include a relay connected state and a direct-connection connected state.

In at least one embodiment, the RLF report may include first relay information. The first relay information may be configured to indicate information of a serving relay device serving the terminal before the RLF occurs.

In at least one embodiment, the first relay information may include at least one of the following: address information of the serving relay device; address information of the terminal; first link quality information, the first link quality information being configured to indicate link quality of a link between the serving relay device and the terminal; or, second link quality information, the second link quality information being configured to indicate link quality of a link between the serving relay device and the access network device.

In at least one embodiment, the RLF report may include second relay information. The second relay information may be configured to indicate information of an adjacent relay device corresponding to the terminal before the RLF occurs, and the adjacent relay device is adjacent to the terminal and does not serve the terminal.

In at least one embodiment, the second relay information may include third link quality information. The third link quality information may be configured to indicate link quality of a link between the terminal and each adjacent relay device.

In at least one embodiment, the link quality may be at least one of RSRP or RSRQ.

In at least one embodiment, the method may further include the following operations.

The access network device acquires wireless environment information. The wireless environment information is reported by each terminal in the relay connected state. The wireless environment information includes first wireless environment information and second wireless environment information. The first wireless environment information is configured to indicate a connection condition between the terminal and a relay device and the second wireless environment information is configured to indicate a connection condition between the relay device and the access network device.

The access network device calculates a similarity of wireless environments where the terminal is located according to the RLF report and the wireless environment information.

In condition that the similarity is greater than a threshold, the access network device reallocates a relay device for the terminal.

According to a third aspect of the embodiments of the disclosure, a report sending device is provided, which includes at least one unit. The at least one unit is configured to implement the report sending method provided in the first aspect or any possible implementation mode in the first aspect.

According to a fourth aspect of the embodiments of the disclosure, a report receiving device is provided, which includes at least one unit. The at least one unit is configured to implement the report receiving method provided in the second aspect or any possible implementation mode in the second aspect.

According to a fifth aspect of the embodiments of the disclosure, a terminal is provided, which includes a processor, a memory, a transmitter and a receiver. The processor is configured to store one or more than one instruction, and the instruction is instructed to be executed by the processor. The processor is configured to control the transmitter and the receiver to implement the report sending method provided in the first aspect or any possible implementation mode in the first aspect.

According to a sixth aspect of the embodiments of the disclosure, an access network device is provided, which includes a processor, a memory, a transmitter and a receiver. The processor is configured to store one or more than one instruction, and the instruction is instructed to be executed by the processor. The processor is configured to control the transmitter and the receiver to implement the report receiving method provided in the second aspect or any possible implementation mode in the second aspect.

According to a seventh aspect of the embodiments of the disclosure, a mobile communication system is provided, which may include a terminal and an access network device.

The terminal may include the report sending device in the third aspect.

The access network device may include the report receiving device in the fourth aspect.

According to a seventh aspect of the embodiments of the disclosure, a mobile communication system is provided, which may include a terminal and an access network device.

The terminal may include the terminal in the fifth aspect.

The access network device may include the access network device in the sixth aspect.

According to a ninth aspect of the embodiments of the disclosure, a computer-readable medium is provided, which stores one or more than one instruction. The instruction is configured to implement the report sending method provided in the first aspect or any possible implementation mode in the first aspect.

According to a tenth aspect of the embodiments of the disclosure, a computer-readable medium is provided, which stores one or more than one instruction. The instruction is configured to implement the report receiving method provided in the second aspect or any possible implementation mode in the second aspect.

The technical solutions provided in the embodiments of the disclosure have the following beneficial effects.

The terminal, after the RLF occurs, generates the RLF report for indicating the wireless environment where the terminal is located when the RLF occurs, and sends the RLF report to the access network device according to the terminal information request sent by the access network device, so that the access network device may identify the wireless environment where the terminal is located when the RLF occurs based on the RLF report, so as to facilitate subsequent optimal management over other accessing terminals based on the wireless environment and improve access quality of the terminals.

BRIEF DESCRIPTION OF DRAWINGS

In order to describe the technical solutions of the embodiments of the disclosure more clearly, the drawings required to be used in descriptions about the embodiments will be simply introduced below. It is apparent that the drawings described below are only some embodiments of the disclosure. Other drawings may further be obtained by those of ordinary skill in the art according to these drawings without creative work.

DETAILED DESCRIPTION

In order to make the purpose, technical solutions and advantages of the disclosure clearer, the implementation modes of the disclosure will further be described below in combination with the drawings in detail.

"Module" mentioned in the disclosure usually indicates a program or instruction stored in a memory and capable of realizing some functions. "Unit" mentioned in the disclosure usually indicates a functional structure which is logically divided. A "unit" may be implemented completely by hardware or implemented by a combination of software and the hardware.

"Multiple" mentioned in the disclosure indicates two or more than two. The term "and/or" describes an association relationship between associated objects and represents that three relationships may exist. For example, A and/or B may represent three conditions: i.e., independent existence of A, existence of both A and B and independent existence of B. Character "/" usually represents that previous and next associated objects form an "or" relationship.

Figure 1:
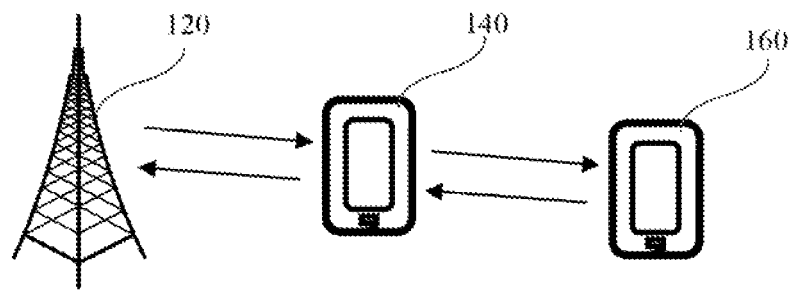
FIG. 1 is a structure diagram of a mobile communication system according to an embodiment of the disclosure.

Referring to FIG. 1, a structure diagram of a mobile communication system according to an embodiment of the disclosure is illustrated. The mobile communication system may be an LTE system, or, the mobile communication system may also be a 5th-Generation (5G) system, also called a New Radio (NR) system. The mobile communication system includes an access network device 120, a relay device 140 and a terminal 160.

The access network device 120 may be a base station. The base station may be configured to mutually convert a received radio frame and an Internet Protocol (IP) packet message, and may further coordinate for attribute management of an air interface. For example, the base station may be an Evolutional Node B (eNB or e-NodeB) in LTE, or, may be a base station adopting a central distributed architecture in the 5G system. The access network device 120, when adopting the central distributed architecture, usually includes a Central Unit (CU) and at least two Distributed Units (DUs). Protocol stacks of a Packet Data Convergence Protocol (PDCP) layer, a Radio Link Control (RLC) layer and a Media Access Control (MAC) layer are arranged in the CU. A Physical (PHY) protocol stack is arranged in the DU. There are no limits made to the specific implementation manner of the access network device 120 in the embodiment of the disclosure.

The relay device 140 establishes a wireless connection with the access network device 120 through a wireless air interface. For example, in the LTE system, the wireless air interface is a Uu interface. In at least one example, the relay device 140 may also access the access network device 120 through a wireless air interface based on a 5G standard or based on a next-generation mobile communication network technology standard of 5G. There are no limits made thereto in the disclosure.

The relay device 140 is a device with a relay function. In the embodiment of the disclosure, the relay device 140, as a relay between the terminal 160 and the access network device 120, also has an interface consistent with a D2D standard, for example, a PC5 interface. Through the interface, the relay device 140 may perform wireless communication with an adjacent device. For example, the relay device 140 is PC5 relay UE.

The terminal 160 may be a device providing voice and/or data connectivity for a user. The terminal 160 may also be called a remote UE. The terminal 160 may communicate with one or more core networks through a Radio Access Network (RAN). The terminal 160 may be a mobile terminal, for example, a mobile phone (or called a "cell" phone), and a computer configured with a mobile terminal, which may be, for example, a portable, pocket, handheld, computer-embedded or vehicle-mounted mobile device, for example, a subscriber unit, a subscriber station, a mobile station, a mobile, a remote station, an access point, a remote terminal, an access terminal, a user terminal, a user agent, a user device or User Equipment (UE).

In the embodiment of the disclosure, the terminal 160 has an interface consistent with the D2D standard, for example, a PC5 interface. Through the interface, the terminal 160 may perform wireless communication with the adjacent relay device 140. Moreover, the access network device 120 stores context information between the relay device 140 and the terminal 160.

A report sending method and report receiving method provided in each embodiment of the disclosure are applied to a scenario that the terminal 160 has an RLF in a relay connected state (communicating with the access network device 120 through the relay device 140), re-establishes a connection with the access network device 120 in a direct-connection connected state and provides an RLF report to the access network device 120.

It is to be noted that the mobile communication system illustrated in FIG. 1 may include multiple access network devices 120, and/or multiple relay devices 140 and/or multiple terminals 160. The numbers of the access network devices, the relay devices and the terminal are not limited in the embodiment.

Figure 2:
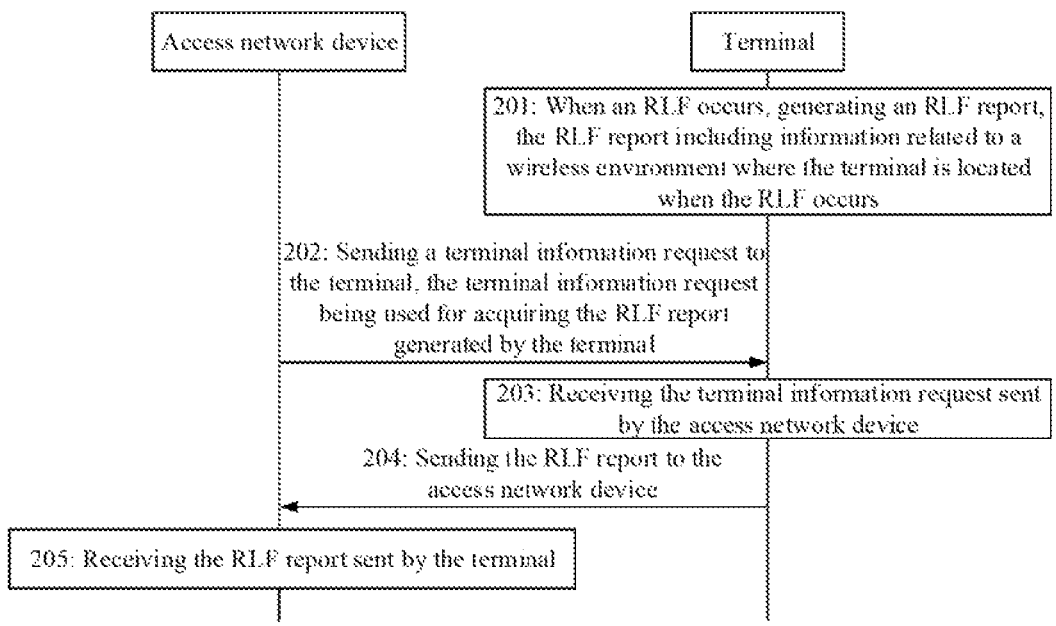
FIG. 2 is a flowchart of a report sending method according to an embodiment of the disclosure.

Referring to FIG. 2, a flowchart of a report sending method according to an embodiment of the disclosure is illustrated. Descriptions are made in the embodiment with application of the report sending method to the mobile communication system illustrated in FIG. 1 as an example. The method includes the following operations.

In 201, when an RLF occurs, a terminal generates an RLF report, and the RLF report includes information related to a wireless environment where the terminal is located when the RLF occurs.

Unlike an RLF report generated by a terminal in the conventional art, in the embodiment of the disclosure, the RLF report generated by the terminal not only includes a cause for the RLF (rlf-Cause) but also includes related information for describing a wireless environment where the terminal is located when the RLF occurs.

In at least one embodiment, the information related to the wireless environment includes a connected state identifier. The connected state identifier is configured to indicate a connected state of the terminal in the wireless environment when the RLF occurs, and the connected state includes a relay connected state and a direct-connection connected state.

In an exemplary embodiment, in an LTE system, when a terminal forms a direct connection with an access network device, the direct-connection connected state is a Uu direct-connection connected state; and when the terminal forms a relay connection with the access network device through a relay device, the relay connected state is a PC5 relay connected state. In different communication systems, different expression manners may be adopted for the relay connected state and the direct-connection connected state. There are no limits made thereto in the disclosure.

In a possible implementation mode, the RLF report includes a preset field configured to store and bear the connected state identifier, and a position of the preset field in the RLF report is predetermined with the access network device. When the RLF report is generated, the terminal writes the corresponding connected state identifier into the preset field. For example, when the RLF occurs for the terminal in the relay connected state, the terminal sets the connected state identifier in the preset field to be 1, and when the RLF occurs for the terminal in the direct-connection connected state, the terminal sets the connected state identifier in the preset field to be 0.

For the timing of generating the RLF report by the terminal, in a possible implementation mode, when T310 timeout occurs (the terminal is not timely recovered from an out-of-synchronism state), or T320 timeout occurs (the terminal is not timely recovered from the out-of-synchronism state and a measurement report has been sent), or random access fails or an RLC retransmission failure occurs, the terminal in the direct-connection connected state determines that the RLF occurs and generates the RLF report indicating that the RLF occurs for the terminal in the direct-connection connected state.

In another possible implementation mode, when the RLC retransmission failure occurs, or responsive to detecting that link quality of a link between the relay device and the access network device deteriorates or responsive to detecting that link quality of a link with the access network device deteriorates, the terminal in the relay connected state determines that the RLF occurs and generates the RLF report indicating that the RLF occurs for the terminal in the relay connected state.

In at least one embodiment, when the RLF occurs for the terminal in the relay connected state, the RLF report includes the connected state identifier, and may further include relay information of a relay device serving the terminal before the RLF occurs and/or relay information of another relay device (non-serving relay device) in the wireless environment where the terminal is located.

In 202, an access network device sends a terminal information request to the terminal, and the terminal information request is used for acquiring the RLF report generated by the terminal.

The terminal, after determining that the RLF occurs, performs RRC connection re-establishment with the access network device.

In a possible implementation mode, the terminal has the RLF in the relay connected state and re-establishes a connection with the access network device in the direct-connection connected state; or, the terminal has the RLF in the relay connected state and re-establishes the connection with the access network device in the relay connected state; or, the terminal has the RLF in the direct-connection connected state and re-establishes the connection with the access network device in the relay connected state; or, the terminal has the RLF in the direct-connection connected state and re-establishes the connection with the access network device in the direct-connection connected state. Descriptions are made in the following embodiments only with the condition that the terminal has the RLF in the relay connected state and re-establishes the connection with the access network device in the direct-connection connected state as an example, and are not intended to limit the disclosure.

For enabling the access network device to know the specific cause for the RLF to facilitate subsequent optimal management over access terminals, the terminal, after re-establishing the connection, identifies that the terminal side stores an RLF message in an RRC connection re-establishment complete message.

In a possible implementation mode, the terminal sets an rlf-InfoAvailable identifier in RRCConnectionReestablishmentComplete to identify that the terminal side stores the RLF message.

Correspondingly, the access network device, after identifying the identifier from the RRC connection re-establishment complete message, sends the terminal information request to the access network device to request for acquiring the RLF message generated by the terminal.

In a possible implementation mode, the access network device sends UEInformationRequest to the terminal and sets rlf-ReportReq-r9 of UEInformationRequest to be TRUE.

In 203, the terminal receives the terminal information request sent by the access network device.

In 204, the terminal sends the RLF report to the access network device.

In a possible implementation mode, the terminal, when identifying that rlf-ReportReq-r9 is TRUE, sends UEInformationResponse to the access network device. UEInformationResponse includes the generated RLF report.

In 205, the access network device receives the RLF report sent by the terminal.

The access network device, after receiving the RLF report, analyzes the RLF report, thereby determining the wireless environment where the terminal is located when the RLF occurs according to the related information of the wireless environment, so as to facilitate optimal management over other terminals in a similar wireless environment and improve access quality of such terminals.

In a possible implementation mode, the access network device predetermines with the terminal that the preset field in the RLF report is used to bear the connected state identifier. After receiving the RLF report, the terminal analyzes the connected state identifier in the preset field, thereby determining the connected state of the terminal before the RLF. For example, when the access network device analyzes that the connected state identifier in the preset field is 1, the access network device determines that the RLF occurs to the terminal in the relay connected state. When the access network device analyzes that the connected state identifier in the preset field is 0, the access network device determines that the RLF occurs to the terminal in the direct-connection connected state.

In at least one embodiment, when the analyzed connected state identifier indicates that the terminal sends the RLF report in the relay connected state, the access network device further acquires the relay information in the RLF report. The relay information includes at least one of relay information of the relay device serving the terminal before the RLF occurs, or relay information of the other relay device (non-serving relay device) in the wireless environment where the terminal is located.

In the embodiment of the disclosure, the terminal, after the RLF occurs, generates the RLF report for indicating the wireless environment where the terminal is located when the RLF occurs, and sends the RLF report to the access network device according to the terminal information request sent by the access network device. Therefore, the access network device may identify the wireless environment where the terminal is located when the RLF occurs based on the RLF report to facilitate subsequent optimal management over the other accessing terminals based on the wireless environment and improve the terminal access quality.

The access network device may determine, based on the received RLF report, the wireless environment where the terminal with the RLF is located in the relay connected state. In at least one embodiment, the access network device, after receiving the RLF report, further acquires wireless environment information reported by each terminal (which is in the relay connected state and has no RLF) and, responsive to detecting that a wireless environment indicated by the wireless environment information is similar to the wireless environment where the terminal with the RLF is located (the RLF is very likely to occur), the access network device actively disconnects the terminal from the presently-connected relay device and re-establishes a relay connection for the terminal. Descriptions will be made below with an exemplary embodiment.

Figure 3:
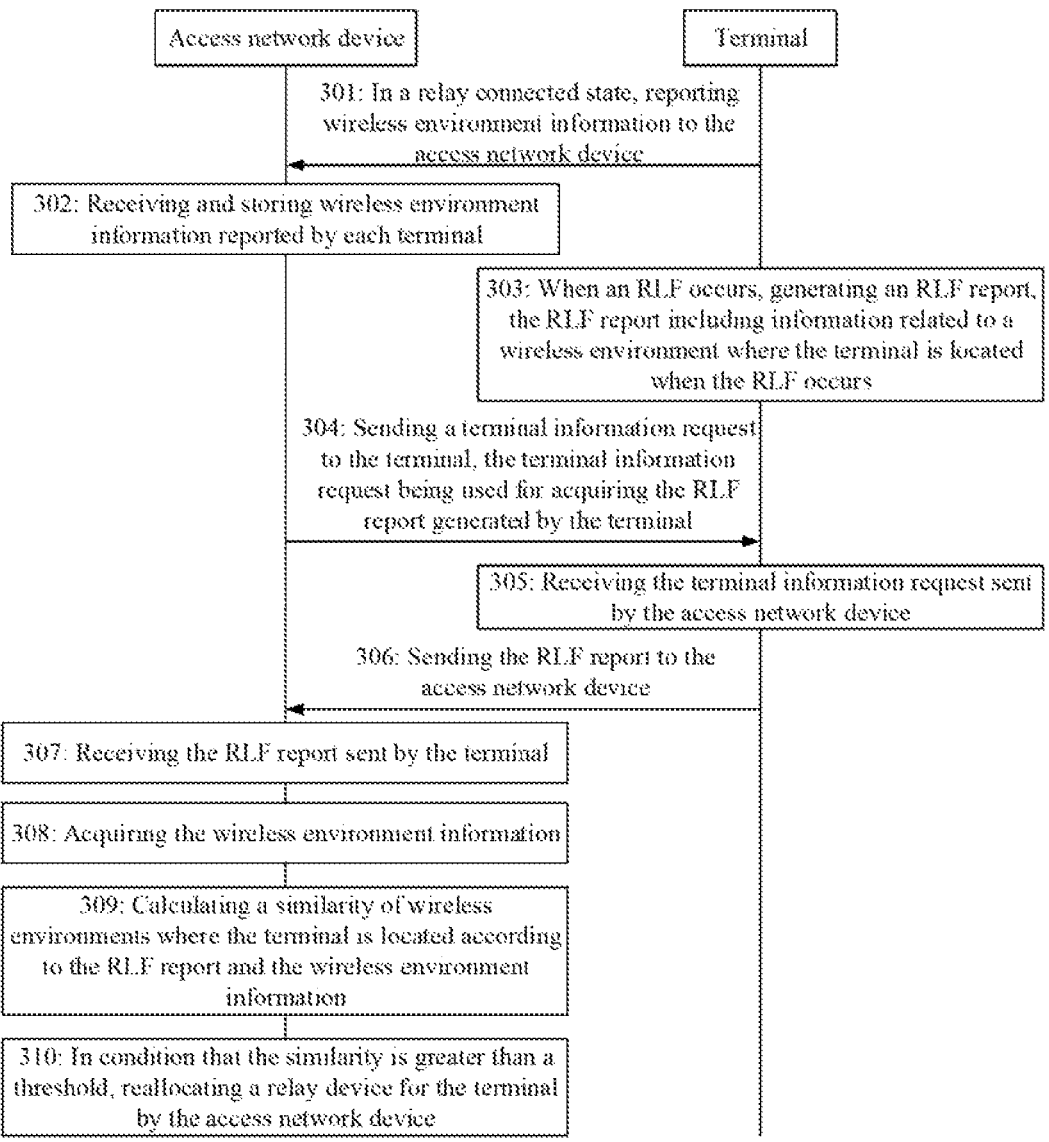
FIG. 3 is a flowchart of a report sending method according to another embodiment of the disclosure.

Referring to FIG. 3, a flowchart of a report sending method according to another embodiment of the disclosure is illustrated. Descriptions are made in the embodiment with application of the report sending method to the mobile communication system illustrated in FIG. 1 as an example. The method includes the following operations.

In 301, when a terminal is in a relay connected state, the terminal reports wireless environment information to an access network device.

In at least one embodiment, the wireless environment information includes first wireless environment information and second wireless environment information. The first wireless environment information is configured to indicate a connection condition between the terminal and a relay device (in a wireless environment where the terminal is located), and the second wireless environment information is configured to indicate a connection condition between the relay device and the access network device (in the wireless environment where the terminal is located).

Schematically, in an LTE system, the first wireless environment information is PC5 relay environment information, and in one embodiment, the PC5 relay environment information includes an identifier of a serving relay device (which establishes a wireless connection with the terminal through a PC5 interface and provides service for the terminal) and an identifier of a non-serving relay device (which does not serve the terminal). In at least one embodiment, the PC5 relay environment information further includes at least one of link quality of a link between the terminal and the serving relay device, address information of the serving relay device, address information of the non-serving relay device or link quality of a link between the terminal and each non-serving relay device. Correspondingly, in the LTE system, the second wireless environment information is Uu relay environment information, and the Uu relay environment information includes link quality of a link between the serving relay device and the access network device.

In a schematic example, the wireless environment information reported to the access network device by the terminal is illustrated in Table 1.

TABLE 1

| Serving relay device | Non-serving relay device | PC5 link quality | Uu link quality |
|---|---|---|---|
| ZJ0001 | ZJ0002, ZJ0003, ZJ0004 | RSRP: −80 dbm RSRQ: 10 dB | RSRP: −75 dbm RSRQ: 12 dB |

In a possible implementation mode, the terminal acquires the first wireless environment information at a predetermined time interval and receives the second wireless environment information reported by the relay device serving the terminal. The specific manner in which the terminal acquires the wireless environment information is not limited in the embodiment of the disclosure.

In 302, the access network device receives and stores the wireless environment information reported by each terminal.

Correspondingly, the access network device receives the wireless environment information reported by each terminal, and associatively stores the terminal and the wireless environment information for subsequent calling.

In 303, when an RLF occurs, the terminal generates an RLF report, and the RLF report includes information related to a wireless environment where the terminal is located when the RLF occurs.

In order to facilitate the access network device to detect a similarity of wireless environments where a terminal with an RLF and without an RLF, in a possible implementation mode, the RLF report generated by the terminal includes a connected state identifier indicating a connected state of the terminal when the RLF occurs, and in addition, the terminal acquires information of the serving relay device serving it before the RLF occurs and adds the information into the RLF report as first relay information.

In at least one embodiment, the first relay information includes at least one of the following information.

1: Address Information of the Serving Relay Device.

When the terminal is in a relay connected state, the wireless environment where the terminal is located includes at least one relay device, one of the at least one relay device establishes a wireless connection with the terminal and communicates, as a relay of the terminal, with the access network device. The relay device is the serving relay device, and the other adjacent relay devices are adjacent relay devices (non-serving relay devices). The terminal, before the RLF occurs, acquires the address information of the serving relay device. In at least one embodiment, the address information is a cell identifier of a cell containing the serving relay device.

Figure 4:
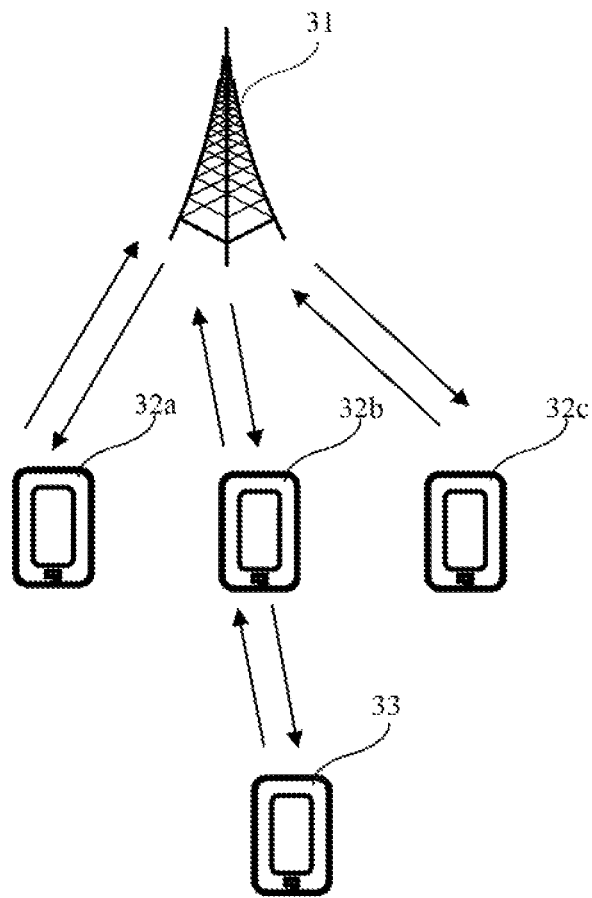
FIG. 4 is a structure diagram of a mobile communication system according to an embodiment of the disclosure.

Schematically, as illustrated in FIG. 4, a wireless environment where a terminal 33 is located before an RLF occurs includes a relay device 32b serving the terminal and adjacent relay devices 32a and 32c (not serving the terminal). The terminal 33, before the RLF occurs, acquires address information of the relay device 32b.

In a schematic example, in the LTE system, the terminal determines address information of PC5 relay UE before occurrence of the RLF as the address information of the serving relay device.

2: Address Information of the Terminal.

For enabling the access network device to know a position of the terminal when the RLF occurs, the terminal determines its own address information as the first relay information. In a schematic example, in the LTE system, the terminal determines address information of remote UE before occurrence of the RLF as the address information of the terminal.

3: First Link Quality Information for Indicating Link Quality of a Link between the Serving Relay Device and the Terminal.

For enabling the access network device to know a link condition between the terminal and the serving relay device, after the terminal establishes the wireless connection with the serving relay device, the terminal collects the link quality of the link with the serving relay device and determines the link quality as the first link quality information. The link quality is at least one of RSRP or RSRQ, etc. A specific representation manner for the link quality is not limited in the embodiment of the disclosure.

Schematically, as illustrated in FIG. 4, the terminal 33 collects RSRP and RSRQ of a link with the relay device 32b and determines them as the first link quality information.

In a schematic example, in the LTE system, the terminal determines link quality of a PC5 link with the PC5 relay UE as the first link quality information.

4: Second Link Quality Information, the Second Link Quality Information being Configured to Indicate Link Quality of a Link between the Serving Relay Device and the Access Network Device.

For enabling the access network device to know a link condition between the serving relay device and the access network device, after the terminal establishes a wireless connection with the access network device through the serving relay device, the terminal acquires the link quality of the link between the serving relay device and the access network device and determines the link quality as the second link quality information. The link quality is RSRP or RSRQ, etc. A specific representation manner for the link quality is not limited in the embodiment of the disclosure.

Schematically, as illustrated in FIG. 4, the terminal 33 collects RSRP and RSRQ of a link between the relay device 32b and an access network device 31 and determines them as the second link quality information.

In a schematic example, in the LTE system, the terminal determines link quality of a Uu link between the PC5 relay UE and an eNB as the second link quality information.

It is to be noted that schematic descriptions are made in the embodiment only with the condition that the first relay information includes the abovementioned information as an example and, in a practical implementation process, the first relay information may include more information related to the serving relay device. There are no limits made thereto in the disclosure.

For describing the wireless environment where the terminal is located before the RLF occurs more accurately, in a possible implementation mode, the RLF report generated by the terminal further includes second relay information. The second relay information is configured to indicate information of the adjacent relay device corresponding to the terminal before the RLF occurs, and the adjacent relay device is adjacent to the terminal and does not serve the terminal.

In at least one embodiment, the second relay information includes third link quality information, and the third link quality information is configured to indicate link quality of a link between the terminal and each adjacent relay device.

Schematically, as illustrated in FIG. 4, the relay device 32a and the relay device 32c are adjacent relay devices corresponding to the terminal 33, and the terminal 33 determines link quality of links with the relay device 32a and the relay device 32c as the third link quality information. The link quality is RSRP and/or RSRQ, etc.

In a schematic example, in the LTE system, the terminal determines the link quality of the Uu link between the PC5 relay UE and the eNB as the second link quality information.

For a manner for acquiring the link quality between the terminal and each adjacent relay device, in a possible implementation mode, the terminal, before establishing a wireless connection with the relay device, acquires and stores the link quality of the link with each relay device according to reference signal receiving/sending quality.

It is to be noted that schematic descriptions are made in the embodiment only with the condition that the second relay information includes the abovementioned information as an example and, in a practical implementation process, the second relay information may include more information related to the adjacent relay device. There are no limits made thereto in the disclosure.

Through the operations, the RLF report generated by the terminal is enhanced to not only indicate the connected state of the terminal before the RLF occurs but also describe the wireless environment where the terminal is located through the relay information therein. The access network device, after receiving the RLF report, may perform optimal management on a terminal in a similar wireless environment.

In 304, the access network device sends a terminal information request to the terminal, and the terminal information request is used for acquiring the RLF report generated by the terminal.

In 305, the terminal receives the terminal information request sent by the access network device.

In 306, the terminal sends the RLF report to the access network device.

In 307, the access network device receives the RLF report sent by the terminal.

Implementation modes of the operations in 304 to 307 are similar to those of the operations in 202 to 205 and will not be elaborated in the embodiment.

In 308, the access network device acquires the wireless environment information.

In 301, the access network device receives and stores the wireless environment information reported by each terminal. The access network device, after receiving the RLF report sent by the terminal, acquires the wireless environment information and determines whether there is a terminal in a similar wireless environment according to the wireless environment information and the RLF report.

In 309, the access network device calculates similarities of wireless environments where the terminals are located according to the RLF report and the wireless environment information.

The access network device may determine, based on the received RLF report, the wireless environment where the terminal is located when the RLF occurs. The access network device may determine, based on the wireless environment information reported by the terminal, a wireless environment where each terminal (without the RLF) is located. Therefore, based on the RLF report and the wireless environment information, the access network device may further calculate similarities of the wireless environments where different terminals are located, to determine a level of a risk that an RLF subsequently occurs to the terminal having no RLF. When the similarity of the wireless environment where the terminal is located is relatively high, the access network device determines that the level of the risk that the RLF occurs to the terminal is relatively high, and executes the operation in 310. When the similarity of the wireless environment where the terminal is located is relatively low, the access network device determines that the level of the risk that the RLF occurs to the terminal is relatively low, and keeps the present connected state of the terminal.

In a possible implementation mode, the access network device calculates a first similarity of a first wireless sub environment (a wireless environment between a terminal and a relay device) according to the RLF report and the first wireless environment information, and/or calculates a second similarity of a second wireless sub environment (a wireless environment between each relay device and the access network device) according to the RLF report and the second wireless environment information, and then calculates the similarities of the wireless environments where different terminals are located according to the first similarity and/or the second similarity.

In a schematic example, in the LTE system, the access network device determines a first PC5 relay wireless environment formed by a terminal with an RLF and the relay device according to the RLF report and determines a second PC5 relay wireless environment formed by a terminal without an RLF and the relay device according to the first wireless environment information. The access network device may calculate a similarity between the first PC5 relay wireless environment and the second PC5 relay wireless environment to determine whether the two terminals are located in similar PC5 relay wireless environments.

Similarly, the access network device determines a first Uu relay wireless environment (corresponding to a terminal with an RLF) formed by the relay device and the access network device according to the RLF report and determines a second Uu relay wireless environment (corresponding to a terminal without any RLF) formed by the relay device and the access network device according to the second wireless environment information. The access network device may calculate a similarity between the first Uu relay wireless environment and the second Uu relay wireless environment to determine whether the two terminals are located in a similar Uu relay wireless environment.

In 310, in condition that the similarity is greater than a threshold, the access network device reallocates a relay device for the terminal.

When the similarity between the wireless environment where the terminal having no RLF is located and the wireless environment where the terminal having the RLF is located is greater than the threshold, the access network device determines that the risk of subsequent RLF for the terminal having no RLF is relatively high. In order to avoid the terminal from occurrence of the RLF, the access network device actively disconnects thee terminal from the present serving relay device and re-allocates a relay device for the terminal, thereby avoiding occurrence of a similar RLF condition.

In the embodiment of the disclosure, the terminal, after the RLF occurs, generates the RLF report for indicating the wireless environment where the terminal is located when the RLF occurs, and sends the RLF report to the access network device according to the terminal information request sent by the access network device, so that the access network device may identify the wireless environment where the terminal is located when the RLF occurs based on the RLF report, to facilitate subsequent optimal management over the other accessing terminals based on the wireless environment and improve the terminal access quality.

In the embodiment, the access network device acquires the wireless environment information reported by each terminal and, after receiving the RLF report sent by the terminal, determines a terminal in a similar wireless environment based on the wireless environment information and the RLF report and re-establishes a relay connection for such terminal, thereby avoiding such terminal from occurrence of an RLF and improving connection quality of the terminal.

It is to be noted that, in each embodiment of the disclosure, the operations performed by the terminal may be independently implemented into a report sending method at a terminal side and the operations performed by the access network device may be independently implemented into a report receiving method at an access network device side, which will not be elaborated in the disclosure.

The below is the device embodiment of the embodiments of the disclosure, and parts which are not elaborated in the device embodiments may refer to technical details disclosed in the method embodiments.

Figure 5:
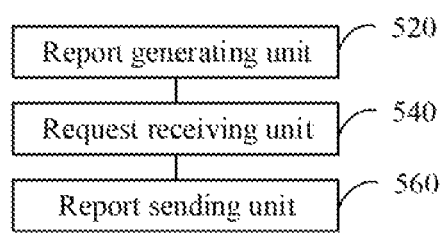
FIG. 5 is a structure diagram of a report sending device according to an embodiment of the disclosure.

Referring to FIG. 5, a structure diagram of a report sending device according to an embodiment of the disclosure is illustrated. The report sending device may be implemented into all or part of a terminal through software, hardware and a combination of both. The report sending device includes a report generating unit 520, a request receiving unit 540 and a report sending unit 560.

The report generating unit 520 is configured to implement the operations in 201 and 303 and a function related to a report generation operation.

The request receiving unit 540 is configured to implement the operations in 203 and 305 and a function related to a request receiving operation.

The report sending unit 560 is configured to implement the operations in 204 and 306 and a function related to a report sending operation.

In at least one embodiment, the device further includes an information reporting unit.

The information reporting unit is configured to implement the operation in 301 and a function related to an information reporting operation.

Figure 6:
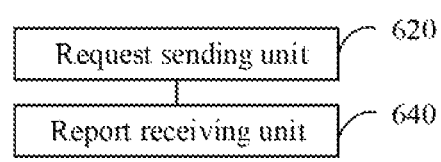
FIG. 6 is a structure diagram of a report receiving device according to an embodiment of the disclosure.

Referring to FIG. 6, a structure diagram of a report receiving device according to an embodiment of the disclosure is illustrated. The report receiving device may be implemented into all or part of an access network device through software, hardware and a combination of both. The report receiving device includes a request sending unit 620 and a report receiving unit 640.

The request sending unit 620 is configured to implement the operations in 202 and 304 and a function related to a request sending operation.

The report receiving unit 640 is configured to implement the operations in 205 and 307 and a function related to a report receiving operation.

In at least one embodiment, the device further includes an information acquisition unit, a calculation unit and an allocation unit.

The information acquisition unit is configured to implement the operation in 308 and a function related to an information acquisition operation.

The calculation unit is configured to implement the operation in 309 and a function related to a calculation operation.

The allocation unit is configured to implement the operation in 310 and a function related to an allocation operation.

Figure 7:
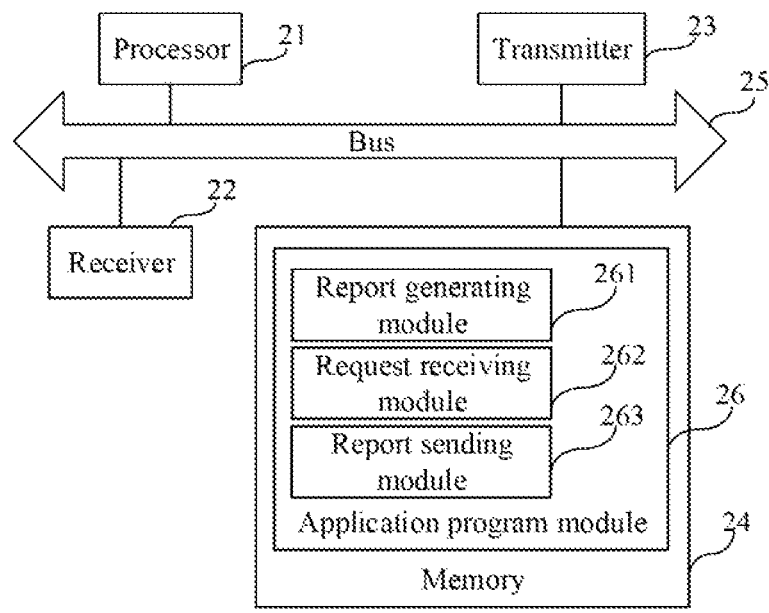
FIG. 7 is a structure diagram of a terminal according to an exemplary embodiment of the disclosure.

Referring to FIG. 7, a structure diagram of a terminal according to an exemplary embodiment of the disclosure is illustrated. The terminal includes a processor 21, a receiver 22, a transmitter 23, a memory 24 and a bus 25.

The processor 21 includes one or more than one processing core. The processor 21 runs software programs and modules, to execute various function applications and information processing.

The receiver 22 and the transmitter 23 may be implemented into a communication component. The communication component may be a communication chip. The communication chip may include a receiving module, a transmitting module, a modem module and the like, and is configured to modulate and/or demodulate information and receive or send the information through a wireless signal.

The memory 24 is connected with the processor 21 through the bus 25.

The memory 24 may be configured to store the software programs and the modules.

The memory 24 may store an application program module 26 for at least one function. The application program module 26 may include a report generating module 261, a request receiving module 262 and a report sending module 263.

The processor 21 is configured to execute the report generating module 261 to realize a function related to a report generation operation in each method embodiment. The processor 21 is configured to execute the request receiving module 262 to realize a function related to a request receiving operation in each method embodiment. The processor 21 is configured to execute the report sending module 263 to realize a function related to a report sending operation in each method embodiment.

In at least one embodiment, the application program module 26 may further include an information reporting module. The processor 21 is configured to execute the information reporting module to realize a function related to an information reporting operation in each method embodiment.

In addition, the memory 24 may be implemented by a volatile or nonvolatile storage device of any type or a combination thereof, for example, an Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic disk or an optical disk.

Figure 8:
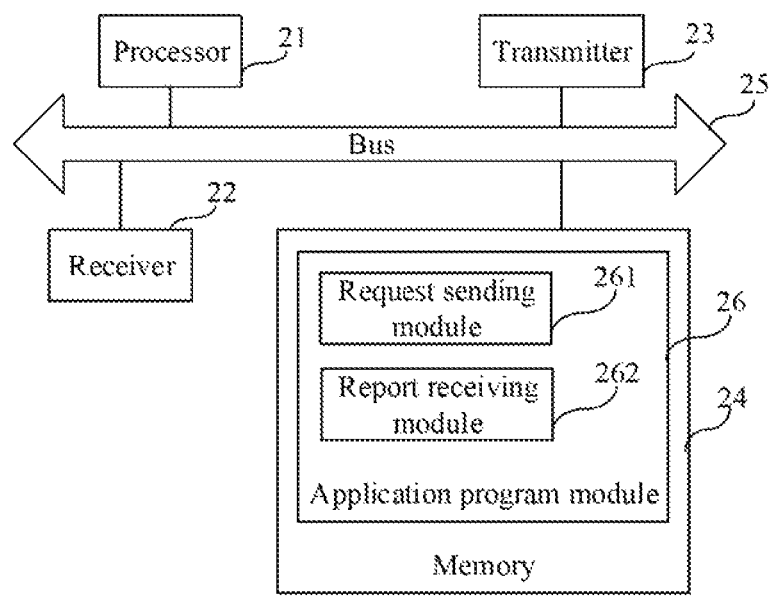
FIG. 8 is a structure diagram of an access network device according to an exemplary embodiment of the disclosure.

Referring to FIG. 8, a structure diagram of an access network device according to an exemplary embodiment of the disclosure is illustrated. The access network device includes a processor 21, a receiver 22, a transmitter 23, a memory 24 and a bus 25.

The processor 21 includes one or more than one processing core. The processor 21 runs software programs and modules, to execute various function applications and information processing.

The receiver 22 and the transmitter 23 may be implemented into a communication component. The communication component may be a communication chip. The communication chip may include a receiving module, a transmitting module, a modem module and the like, and is configured to modulate and/or demodulate information and receive or send the information through a wireless signal.

The memory 24 is connected with the processor 21 through the bus 25.

The memory 24 may be configured to store the software programs and the modules.

The memory 24 may store an application program module 26 for at least one function. The application program module 26 may include a request sending module 261 and a report receiving module 262.

The processor 21 is configured to execute the request sending module 261 to realize a function related to a request sending operation in each method embodiment. The processor 21 is configured to execute the report receiving module 262 to realize a function related to a report receiving operation in each method embodiment.

In at least one embodiment, the application program module 26 further includes an information acquisition module, a calculation module and an allocation module.

The processor 21 is configured to execute the information acquisition module to realize a function related to an information acquisition operation in each method embodiment. The processor 21 is configured to execute the calculation module to realize a function related to a calculation operation in each method embodiment. The processor 21 is configured to execute the allocation module to realize a function related to an allocation operation in each method embodiment.

In addition, the memory 24 may be implemented by a volatile or nonvolatile storage device of any type or a combination thereof, for example, an SRAM, an EEPROM, an EPROM, a PROM, a ROM, a magnetic memory, a flash memory, a magnetic disk or an optical disk.

Those skilled in the art may realize that, in one or more abovementioned examples, the functions described in the embodiments of the disclosure may be realized through hardware, software, firmware or any combination thereof. When being realized through the software, these functions may be stored in a computer-readable medium or transmitted as one or more instructions or codes in the computer-readable medium. The computer-readable medium includes a computer storage medium and a communication medium, and the communication medium includes any medium for transmitting a computer program from one place to another place. The storage medium may be any available medium accessible for a universal or dedicated computer.

The above is only the specific embodiment of the disclosure and not intended to limit the disclosure. Any modifications, equivalent replacements, improvements and the like made within the spirit and principle of the disclosure shall fall within the scope of protection of the disclosure.

The invention claimed is:

1. A report sending method, comprising:
    generating, by a terminal when a radio link failure (RLF) occurs, an RLF report, the RLF report comprising information related to a wireless environment where the terminal is located when the RLF occurs;
    receiving, by the terminal, a terminal information request sent by an access network device, the terminal information request being configured for acquiring the RLF report generated by the terminal; and
    sending, by the terminal, the RLF report to the access network device.

2. The method of claim 1, wherein the RLF report comprises a connected state identifier, the connected state identifier is configured for indicating a connected state of the terminal in the wireless environment when the RLF occurs, and the connected state comprises a relay connected state and a direct-connection connected state.

3. The method of claim 1, wherein the RLF report comprises first relay information, the first relay information being configured for indicating information of a serving relay device serving the terminal before the RLF occurs.

4. The method of claim 3, wherein the first relay information comprises at least one of the following:
    address information of the serving relay device;
    address information of the terminal;
    first link quality information, the first link quality information being configured for indicating link quality of a link between the serving relay device and the terminal; or,
    second link quality information, the second link quality information being configured for indicating link quality of a link between the serving relay device and the access network device.

5. The method of claim 1, wherein the RLF report comprises second relay information, the second relay information is configured for indicating information of an adjacent relay device corresponding to the terminal before the RLF occurs, and the adjacent relay device is adjacent to the terminal and does not serve the terminal.

6. The method of claim 5, wherein the second relay information comprises third link quality information, the third link quality information being configured for indicating link quality of a link between the terminal and each adjacent relay device.

7. The method of claim 1, further comprising:
    when the terminal is in a relay connected state, reporting, by the terminal, wireless environment information to the access network device, the wireless environment information comprising first wireless environment information and second wireless environment information, wherein the first wireless environment information is configured for indicating a connection condition between the terminal and a relay device and the second wireless environment information is configured for indicating a connection condition between the relay device and the access network device.

8. A terminal, comprising:
a processor, configured to, when a radio link failure (RLF) occurs, generate an RLF report, the RLF report comprising information related to a wireless environment where the terminal is located when the RLF occurs;
a receiver, configured to receive a terminal information request sent by an access network device, the terminal information request being configured for acquiring the RLF report generated by the terminal; and
a transmitter, configured to send the RLF report to the access network device.

9. The terminal of claim 8, wherein the RLF report comprises a connected state identifier, the connected state identifier is configured for indicating a connected state of the terminal in the wireless environment when the RLF occurs, and the connected state comprises a relay connected state and a direct-connection connected state.

10. The terminal of claim 8, wherein the RLF report comprises first relay information, the first relay information being configured for indicating information of a serving relay device serving the terminal before the RLF occurs.

11. The terminal of claim 10, wherein the first relay information comprises at least one of the following:
address information of the serving relay device;
address information of the terminal;
first link quality information, the first link quality information being configured to indicate link quality of a link between the serving relay device and the terminal;
or,
second link quality information, the second link quality information being configured to indicate link quality of a link between the serving relay device and the access network device.

12. The terminal of claim 8, wherein the RLF report comprises second relay information, the second relay information is configured for indicating information of an adjacent relay device corresponding to the terminal before the RLF occurs, and the adjacent relay device is adjacent to the terminal and does not serve the terminal.

13. The terminal of claim 12, wherein the second relay information comprises third link quality information, the third link quality information being configured for indicating link quality of a link between the terminal and each adjacent relay device.

14. The terminal of claim 8, wherein the transmitter is further configured to:
when the terminal is in a relay connected state, report wireless environment information to the access network device, the wireless environment information comprising first wireless environment information and second wireless environment information,
wherein the first wireless environment information is configured for indicating a connection condition between the terminal and a relay device and the second wireless environment information being configured for indicating a connection condition between the relay device and the access network device.

15. An access network device, comprising:
a transmitter, configured to send a terminal information request to a terminal, the terminal information request being configured for acquiring a radio link failure (RLF) report generated by the terminal and the RLF report comprising information related to a wireless environment where the terminal is located when an RLF occurs; and
a receiver, configured to receive the RLF report sent by the terminal.

16. The access network device of claim 15, wherein the RLF report comprises a connected state identifier, the connected state identifier is configured for indicating a connected state of the terminal in the wireless environment when the RLF occurs, and the connected state comprises a relay connected state and a direct-connection connected state.

17. The access network device of claim 15, wherein the RLF report comprises first relay information, the first relay information being configured for indicating information of a serving relay device serving the terminal before the RLF occurs.

18. The access network device of claim 17, wherein the first relay information comprises at least one of the following:
address information of the serving relay device;
address information of the terminal;
first link quality information, the first link quality information being configured to indicate link quality of a link between the serving relay device and the terminal;
or,
second link quality information, the second link quality information being configured to indicate link quality of a link between the serving relay device and the access network device.

19. The access network device of claim 15, wherein the RLF report comprises second relay information, the second relay information is configured for indicating information of an adjacent relay device corresponding to the terminal before the RLF occurs, and the adjacent relay device is adjacent to the terminal and does not serve the terminal.

20. The access network device of claim 15, wherein the processor is further configured to:
acquire wireless environment information, the wireless environment information being reported by each terminal in a relay connected state, the wireless environment information comprising first wireless environment information and second wireless environment information, the first wireless environment information being configured for indicating a connection condition between the terminal and a relay device and the second wireless environment information being configured for indicating a connection condition between the relay device and the access network device;
calculate a similarity of wireless environments where the terminal is located according to the RLF report and the wireless environment information; and
in condition that the similarity is greater than a threshold, reallocate a relay device for the terminal.

* * * * *